United States Patent
Bayang et al.

(10) Patent No.: US 10,114,720 B2
(45) Date of Patent: *Oct. 30, 2018

(54) ESTIMATING POWER USAGE IN A COMPUTING ENVIRONMENT

(71) Applicant: INTERNATIONAL BUSINESS MACHINES CORPORATION, Armonk, NY (US)

(72) Inventors: Josephine F. Bayang, Tucson, AZ (US); Valerio Bellizia, Carpineto Romano (IT); Michael Gaertner, Weisbadan (DE); Dillon H. Ginley, Fairfax, VA (US); Diana J. Hellman, Tucson, AZ (US); Jeffrey O. Kephart, Cortlandt Manor, NY (US); Attila Kollar, Verőce (HU); James K. MacKenzie, Renfrewshire (GB); Wayne B. Riley, Denver, CO (US); Srinivasarao Siddabattini, Bangalore (IN); Stephen Viselli, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 334 days.

This patent is subject to a terminal disclaimer.

(21) Appl. No.: 14/065,911

(22) Filed: Oct. 29, 2013

(65) Prior Publication Data

US 2014/0237269 A1    Aug. 21, 2014

Related U.S. Application Data

(63) Continuation of application No. 13/773,234, filed on Feb. 21, 2013.

(51) Int. Cl.
  *G06F 1/00* (2006.01)
  *G06F 11/30* (2006.01)
  *G06F 11/34* (2006.01)

(52) U.S. Cl.
  CPC ...... *G06F 11/3062* (2013.01); *G06F 11/3409* (2013.01); *G06F 11/3447* (2013.01); *Y02D 10/34* (2018.01)

(58) Field of Classification Search
  CPC ............ G06F 11/3062; G06F 11/3409; G06F 11/3447
  See application file for complete search history.

(56) References Cited

U.S. PATENT DOCUMENTS

| | | |
|---|---|---|
| 2006/0136793 A1 | 6/2006 | Wang et al. |
| 2007/0220292 A1 | 9/2007 | Ishihara et al. |
| 2009/0006878 A1 | 1/2009 | Borghetti et al. |
| 2009/0171646 A1 | 7/2009 | Silbermintz et al. |
| 2011/0016342 A1 | 1/2011 | Rowan et al. |

(Continued)

OTHER PUBLICATIONS

Lee et al., "An Energy Characterization Framework for Software-Based Embedded Systems," ESTIMedia, 2006 (6 pages).

(Continued)

*Primary Examiner* — Austin Hicks
(74) *Attorney, Agent, or Firm* — Griffiths & Seaton PLLC (57) ABSTRACT

Power usage is estimated in a computing environment by automatically detecting hardware configuration information by use of a software agent that is translated into power consumption information for implementing a plurality of power estimation models for efficient power consumption and utilization.

11 Claims, 4 Drawing Sheets

(56) References Cited

U.S. PATENT DOCUMENTS

| | | |
|---|---|---|
| 2011/0072138 A1* | 3/2011 | Canturk .............. G06F 9/5011 709/226 |
| 2011/0113273 A1* | 5/2011 | Okitsu .................. G06F 1/206 713/320 |
| 2011/0145612 A1 | 6/2011 | Gellerich et al. |
| 2011/0191609 A1 | 8/2011 | Van Bokhoven et al. |
| 2011/0208622 A1 | 8/2011 | Gopisetty et al. |
| 2012/0011378 A1 | 1/2012 | Dalton et al. |
| 2012/0030356 A1 | 2/2012 | Fletcher |
| 2013/0290536 A1* | 10/2013 | Dutta .................. G06F 9/5027 709/226 |

OTHER PUBLICATIONS

Lien et al., "Estimation by Software for the Power Consumption of Streaming-Media Servers," IEEE Transactions on Instrumentation and Measurement, vol. 56, No. 5, Oct. 2007 (12 pages).

* cited by examiner

ESTIMATING POWER USAGE IN A COMPUTING ENVIRONMENT

CROSS REFERENCE TO RELATED APPLICATIONS

This application is a Continuation of U.S. patent application Ser. No. 13/773,234, filed on Feb. 21, 2013.

FIELD OF THE INVENTION

The present invention relates in general to computers, and more particularly to mechanisms for measuring or estimating the dynamic power usage of hardware components in a computing environment.

DESCRIPTION OF THE RELATED ART

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. Given that vast amount of power consumption by these computing systems, a need exists for increased efficiency in measuring and estimating the power usage in the computing systems.

SUMMARY OF THE DESCRIBED EMBODIMENTS

The present invention relates to computers and more particularly, mechanisms for measuring or estimating the dynamic power usage of hardware components in a computing environment. In many computing environments are hardware components without an ability to self-report power usage information to an appropriate monitoring destination. The present invention addresses this need by implementing a mechanism by detecting hardware configuration information automatically by use of a software agent that is translated into power consumption information for the benefit of a monitoring component. The power consumption information may be used to implement power estimation models for efficient power consumption/utilization in these computing environments.

In one embodiment, a software agent collects both hardware configuration and real time metrics from the hardware component(s). In addition to the software agent, an extensible power consumption model, while the computing environment runs, periodically maps the hardware configuration and real-time metric data to a power consumption estimate. In turn, the power consumption estimate may be read by a monitoring system just as if the power consumption estimate were an actual measurement of a particular data metric.

In one embodiment, a system for estimating the power consumption of a computing device for which no direct power measurement is available is disclosed. The system (a), collects from a computing device hardware configuration data that are pertinent to power consumption, (b), matches the collected hardware configuration data against a set of models that estimate power consumption for a given hardware configuration and a given set of metric data, (c), selects from among the set of power estimation models a model that most closely matches the collected hardware configuration data, (d), collects periodically from the computing device a set of metrics that are required by the selected power estimation model, and (e), periodically applies the selected power estimation model to the collected metrics to produce an estimate of the power consumption of the device.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Measuring and estimating the power usage of computers, such as servers, is vital to any company trying to understand the computer's overall power usage. Currently, the only ways to measure/estimate the power usage of a server are by either measuring the power usage using an external device and/or using power-estimator software from the brand server a user is using (e.g., IBM® software can measure IBM servers, HP® software can measure HP servers, etc.). However, if the customer is using IBM software, but is running HP servers, the only option is to use an external device (hardware solution). These solutions provide a static estimation of the power consumption of the device, but fail to address the real-time, or dynamic, aspect of power consumption for these devices. Thus, a need exists for a software solution to be able to measure/estimate power usage where one vendor provides the hardware equipment and another vendor provides the operating software. More specifically, a need exists for a software solution to be able to measure/estimate power usage of non-IBM servers with IBM software.

In contrast, and to address the need for real-time, or dynamic, aspect of power consumption for these devices, the illustrated embodiments provide a solution for measuring and/or estimating the dynamic power usage of hardware components in a computing environment. The present invention provides the ability to self-report power usage information to an appropriate monitoring destination by implementing a mechanism for automatically detecting hardware configuration information, by use of a software agent, which is translated into power consumption information for the benefit of a monitoring component. The power consumption information may be used to implement a power estimation model from a set of power estimation models for efficient power consumption/utilization in these computing environments.

In one embodiment, a software agent collects both hardware configuration and real time metrics from the hardware component(s). In addition to the software agent, an extensible power consumption model, while the computing environment runs, periodically maps the hardware configuration and real-time metric data to a power consumption estimate. In turn, the power consumption estimate may be read by a monitoring system just as if the power consumption estimate were an actual measurement of a particular data metric.

In one embodiment, a system for estimating the power consumption of a computing device for which no direct power measurement is available is disclosed. The system (a), collects from a computing device hardware configuration data that are pertinent to power consumption, (b), matches the collected hardware configuration data against a set of models that estimate power consumption for a given hardware configuration and a given set of metric data, (c), selects from among the set of power estimation models a model that most closely matches the collected hardware configuration data, (d), collects periodically from the computing device a set of metrics that are required by the selected power estimation model, and (e), periodically applies the selected power estimation model to the collected metrics to produce an estimate of the power consumption of the device.

Figure 1:
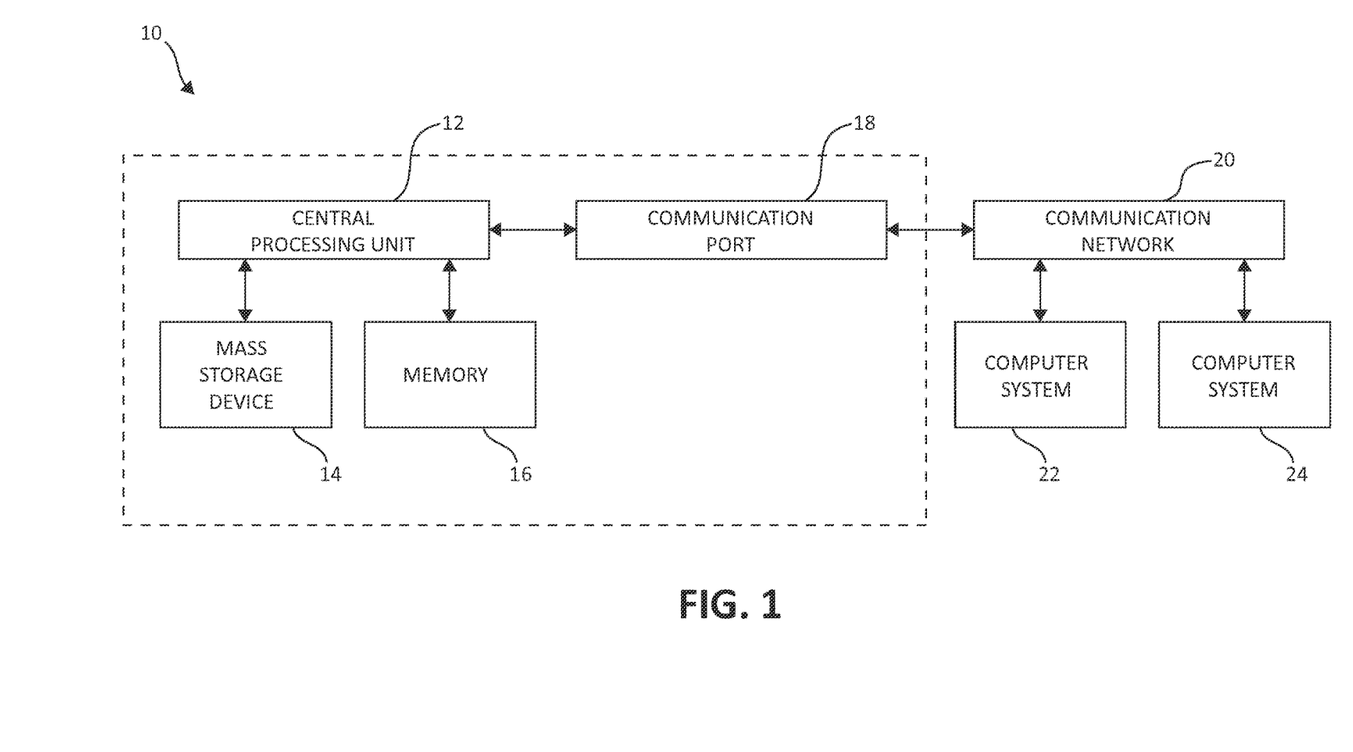
FIG. 1 is a block diagram illustrating a computing system environment having an example storage device in which aspects of the present invention may be realized.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 22, 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 22, 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
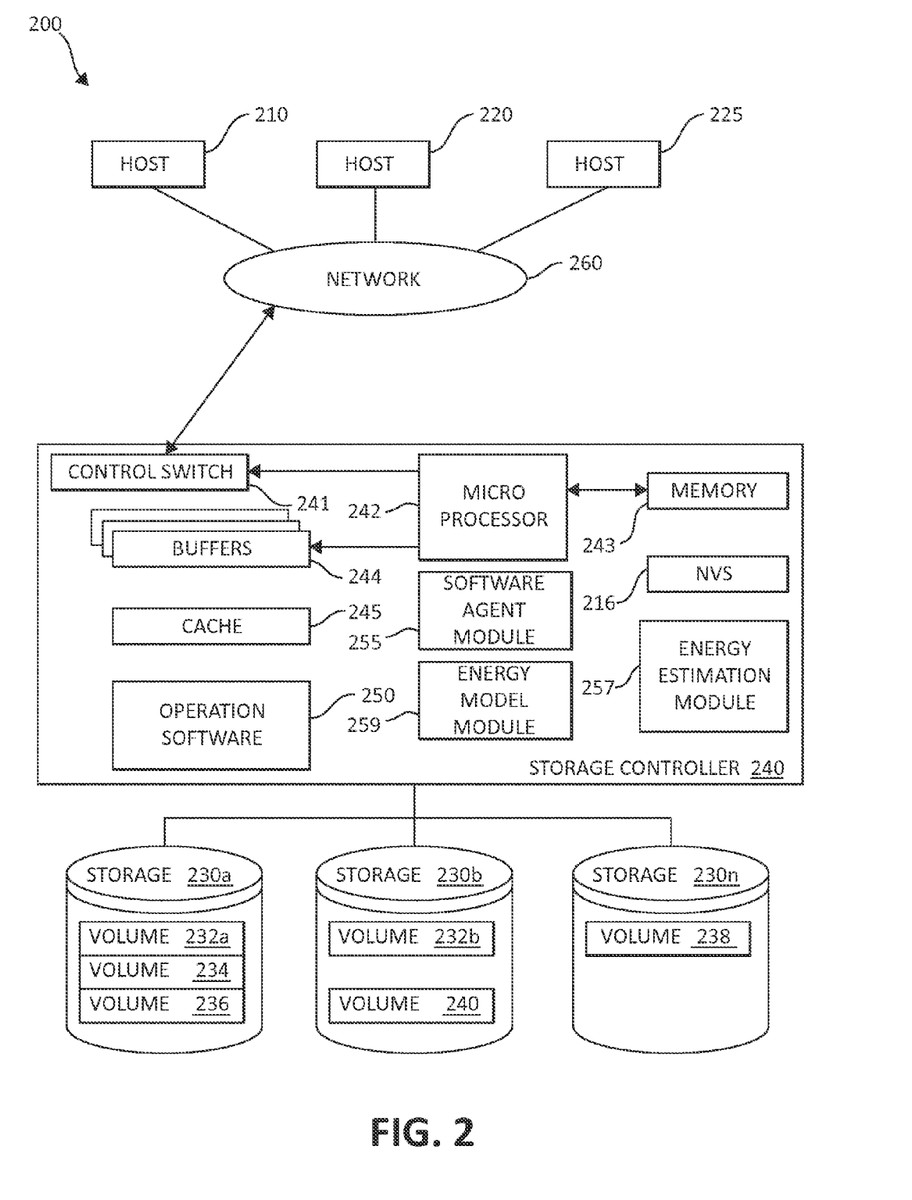
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER™ TS7650G™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a software agent module 255, a power estimation module 257, and a power model module 259. The software agent module 255, the power estimation module 257, and the power model module 259 may work in conjunction with each and every component of the storage controller 240, the hosts 210, 220, 225, and storage devices 230. The software agent module 255, the power estimation module 257, and the power model module 259 may be structurally one complete module or may be associated and/or included with other individual modules. The software agent module 255, the power estimation module 257, and the power model module 259 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the software agent module 255, the power estimation module 257, and the power model module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, software agent module 255, the power estimation module 257, and the power model module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the software agent module 255, the power estimation module 257, and the power model module 259 may also be located in the cache 245 or other components. As such, one or more of the software agent module 255, the power estimation module 257, and the power model module 259 maybe used as needed, based upon the storage architecture and users preferences.

As will be illustrated below, real-time hardware component metrics from an information technology (IT) device, available from traditional monitoring techniques, are combined with a flexible and extensible power consumption model for the IT hardware to calculate power usage. In one embodiment, software agents are used for monitoring the processor usage on the IT device, and the software agents estimate the power usage based on a linear power model. The power model is calculated from known minimum/maximum power usage for a particular server. The present invention does not require any external devices of any kind, and requires only minimal input from a user, while performing all of the monitoring, calculating, and reporting for estimating the power usage of the hardware components. The power model allows for extensible attributes to be defined for the IT hardware device for allowing the model to be modified and expanded.

Figure 3:
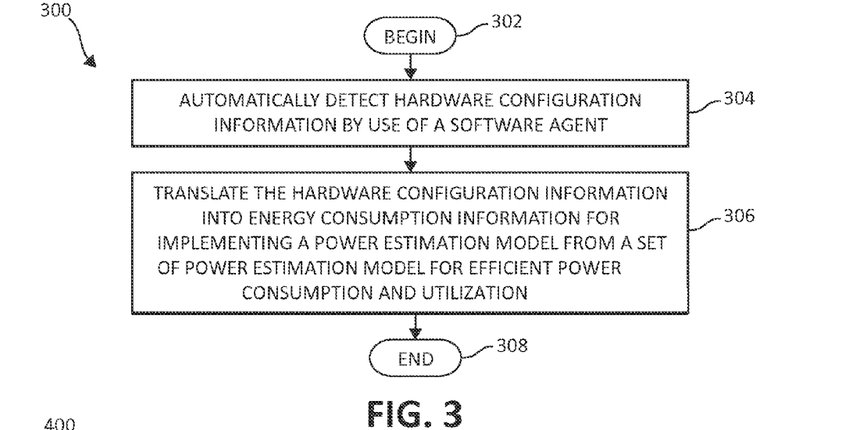
FIG. 3 is a flowchart illustrating an exemplary method estimating the dynamic power usage of hardware components in a computing environment.

FIG. 3 is a flowchart illustrating an exemplary method 300 estimating the dynamic power usage of hardware components in a computing environment. In one embodiment, by way of example only, the method 300 begins (step 302)

estimating/measuring the power usage of the hardware components by automatically detecting hardware configuration information by use of a software agent (step 304). The hardware configuration information is translated into power consumption information for implementing a power estimation model from a set of power estimation models for efficient power consumption and utilization (step 306). The method ends (step 308).

Figure 4:
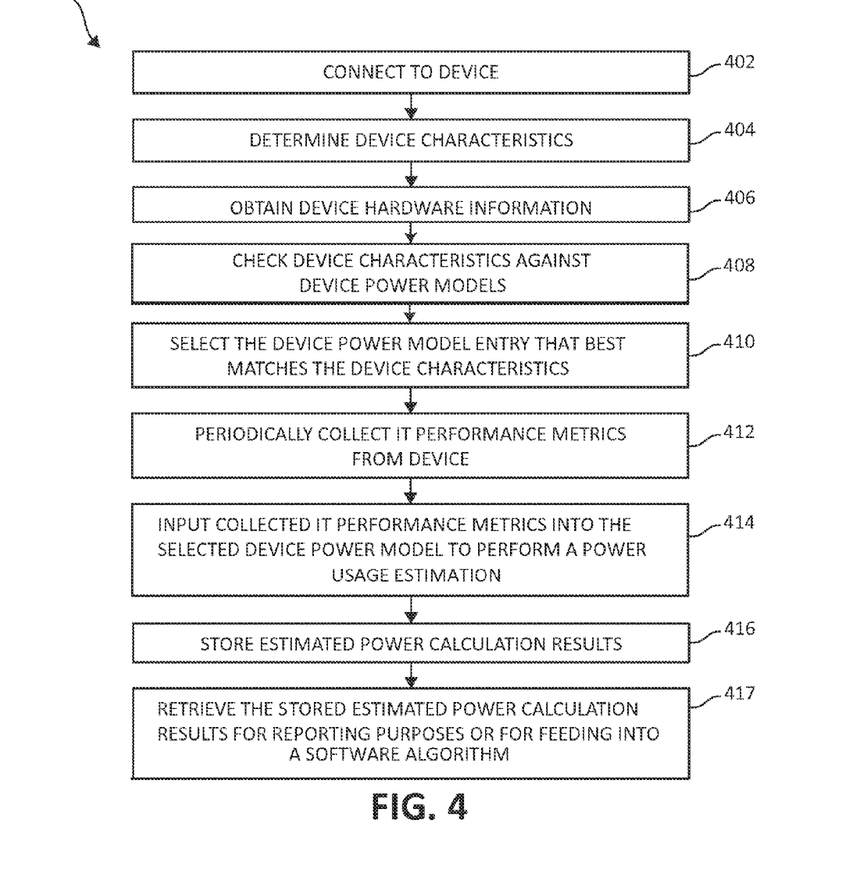
FIG. 4 is an additional flowchart illustrating an exemplary method for estimating the dynamic power usage of hardware components in a computing environment.

FIG. 4 is an additional flowchart illustrating an exemplary method 400 for estimating the dynamic power usage of hardware components in a computing environment. The method 400 begins by connecting to a hardware component device (e.g., a computing device) (step 402). The method 400 determines the characteristics of the hardware device (step 404). The hardware device's hardware information is obtained (step 406). The method 400 checks the detected characteristics of the hardware device against a library of device power models (step 408). The device power model entry that best matches the characteristics of the hardware device is selected (step 410). The method 400 periodically collects information technology (IT) performance metrics from the hardware device (step 412). The collected information technology (IT) performance metrics are input to the selected device power model to perform a power usage estimation (step 414). The estimated power calculation results are stored (step 416), such that they can be retrieved later for reporting purposes, or fed directly into other software (step 417), such as IBM's ITMfEM® management monitor.

Figure 5:
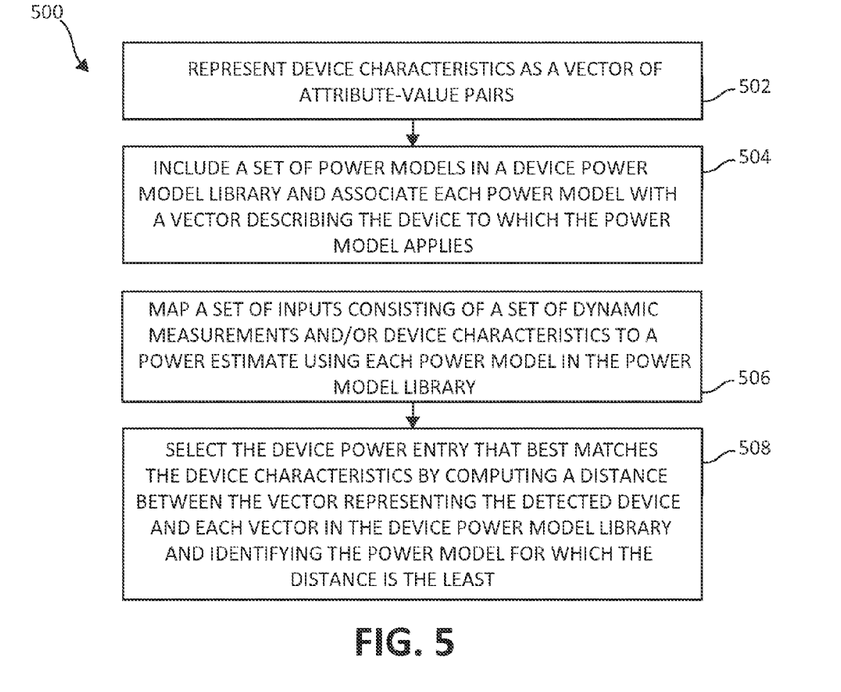
FIG. 5 is a flowchart illustrating an exemplary method for selecting the device power model entry that best matches the characteristics of the hardware device (FIG. 4, step 410)

In one embodiment, selecting a device power model that best matches the detected characteristics of the hardware device (step 410) may be implemented in various ways. Turning now to FIG. 5, a flowchart illustrating an exemplary method 500 for selecting the device power model entry that best matches the characteristics of the hardware device (FIG. 4, step 410) is depicted. In one embodiment, the hardware characteristics of any device are represented as a vector of attribute-value pairs (step 502), where the attributes may for example include the maker and type of the device. The attributes may also include the type of the components of that device, such as CPU, memory, and attached storage. Optionally, the attributes may further include the number of each of the components of the device, including CPU, memory, and attached storage. The method 500 includes in a hardware device power model library a set of power models, each of which is associated with a vector describing the hardware device to which that model applies (step 504). The method 500 maps a set of inputs consisting of a set of dynamic measurements and possibly device characteristics to a power consumption estimate (step 506). Each hardware device power model in the library is a function that maps a set of inputs consisting of a set of dynamic measurements and possibly device characteristics to a power consumption estimate. The selection of a best model is performed by computing a distance between the vector representing the detected device and each vector in the hardware device power model library and identifying the model for which the distance is least (step 508).

Figure 6:
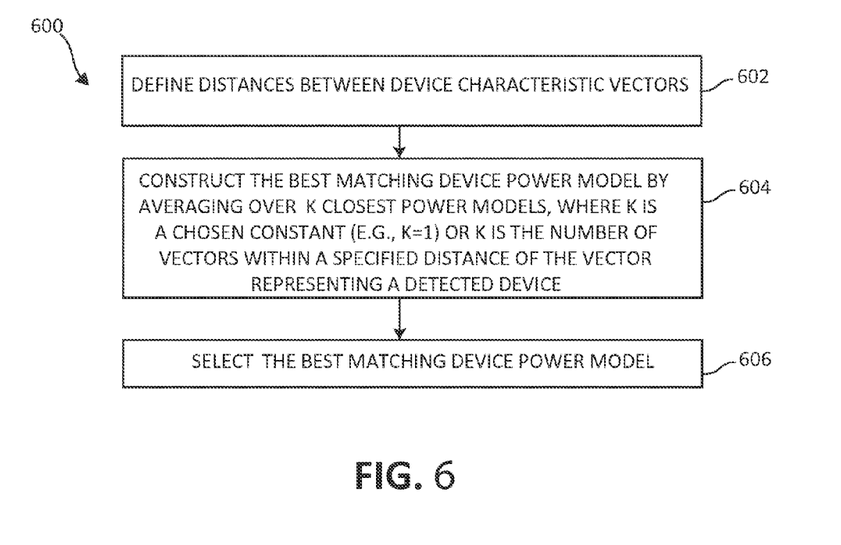
FIG. 6 is a flowchart illustrating an additional exemplary method for selecting the device power model entry that best matches the characteristics of the hardware device (FIG. 4, step 410).

Turning now to FIG. 6, a flowchart illustrating an alternative exemplary method 600 for selecting the device power model entry that best matches the characteristics of the hardware device (FIG. 4, step 410) is depicted. The method 600 defines distances between device characteristics (step 602). The method constructs the best matching power model by averaging over the k closest models, where k is a chosen constant (e.g., a constant equivalent to k=1), or k is the number of vectors within a specified distance of the vector representing the detected hardware device (step 604). The best matching power model is selected (step 606).

More specifically, as described in FIG. 6, in an alternative embodiment, a best model is constructed by averaging over the k closest models, where k is a chosen constant (the preferred embodiment is equivalent to k=1), or k is the number of vectors within a specified distance of the vector representing the detected hardware device. In one embodiment, relating to FIG. 6, step 602, the distance between two hardware device characteristic vectors can be defined as the square root of the sum of the squares of the distances between the individual attributes of the vector. The distances between the individual attributes can be defined as follows. If the possible values of the attribute are numeric, then a preferred way to define the distance between two values is the absolute value of the difference between those values. If the possible values of the attribute are an enumerated list (such as a list of vendors or types), then the distance could be defined as 0 if the values are identical and some fixed positive value if they are not.

As will be appreciated by one skilled in the art, many other definitions of distances between individual attributes, or between two vectors, may be used. The library of hardware device power models may be created by experimentation, or by a human expert who consulting hardware power estimators provided by vendors. The inputs to any given hardware device power model may include, but are not limited to, the amount of memory in use, the number of processors and their current utilization levels, and the amount of storage contained in or attached to the device, and the current level of read and write activity on any of the contained or attached storage.

In one embodiment, by way of example only, the selected best hardware device power model that maps a set of inputs to a power consumption estimate may be a linear function of its inputs. The model contains the power usage for each component of the hardware device at the lowest and the highest levels of utilization, performs a linear interpolation based on the measured current utilization, and adds the results to obtain a total power consumption estimate. The minimum and the maximum power usage numbers are collected from available online tools, such as IBM's x-Series estimator website. As mentioned above, software agents collect and report the system usage based on the operating system (e.g., Microsoft's® Windows, Linux®, and/or HPUX® operating systems) to the overall software of the present invention. As a simple example, suppose that the power usage due to memory and storage are minimal, i.e. nearly all of the power is consumed by the CPU. In this case, the minimum and maximum power usage and the CPU utilization yield the following power model, which provides the estimated power usage as a linear function of the CPU utilization:

$$\text{Estimated power}=[(\text{max power}-\text{min power})*(\text{CPU utilization})]+(\text{min power})] \quad (1).$$

The estimated power is then calculated on a regular basis, and is either stored or made available to be fed into other software, such as IBM's ITMfEM management monitor.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for estimating power usage in a computing environment using differing manufacturers of hardware and software executed on the hardware, by a processor device, comprising:

automatically, and with no input from a user, detecting hardware configuration information by comparing detected device characteristics and checking the detected characteristics against a library of device power models by use of a software agent in lieu of using an external power measurement device, the library of device power models comprising known minimum and maximum electrical power consumption rates for each device in the library, and including as input to a device power model for a given device in the library at least: an amount of memory currently in use, a number of physical processors and associated current utilization levels, an amount of storage contained or attached to the given device, and a current level of read and write activity on any of the contained or attached storage; wherein the detected hardware configuration information is translated into power consumption information for implementing one of a plurality of power estimation models for measuring electrical power consumption and utilization, the one of the plurality of power estimation models implemented by transmitting the power consumption information to a management application which reads the power consumption information provided by the software agent as if the power consumption information were an actual measurement of a particular data metric;

storing the power consumption information within a storage device in the computing environment, wherein the power consumption information is transmitted from the storage device to the management application;

optimizing, through the management application, the electrical power consumption and utilization of detected hardware within the computing environment associated with the detected hardware configuration information to increase an efficiency of the electrical power consumption and utilization; and integrating a minimum and a maximum power usage and utilization of a plurality of hardware components into a linear power model.

2. The method of claim 1, further including collecting both hardware configuration metrics and real time metrics from a plurality of hardware components by the software agent.

3. The method of claim 2, further including periodically mapping data of the hardware configuration metrics and the real time metrics, by an extensible power consumption model, to a power consumption estimate that may be read by a monitoring system just as if the power consumption estimate were an actual measurement of a particular data metric.

4. The method of claim 1, further including estimating power consumption of a computing device by performing at least one of:

collecting from the computing device hardware configuration data that are pertinent to power consumption, and matching the collected hardware configuration data against the plurality of power estimation models that estimate power consumption for a given hardware configuration and a given set of metric data.

5. The method of claim 4, further including estimating power consumption of the computing device by performing at least one of:

selecting one of the plurality of power estimation models that most closely matches the collected hardware configuration data, and collecting periodically from the computing device a set of metrics that are required by the selected one of the plurality of power estimation models.

6. The method of claim 5, further including periodically applying the selected one of the plurality of power estimation models to the collected set of metrics to produce an estimate of the power consumption of the computing device.

7. The method of claim 1, further including using a mathematical equation of {(power used)=[(max power−min power)*(system utilization)]+(min power)} for the linear power model, where power used is an amount of power used by one of the plurality of hardware components, max power is the maximum power usage of the one of the plurality of hardware components, min power is the minimum power usage of the one of the plurality of hardware components, and system utilization is the utilization of the one of the plurality of hardware components.

8. The method of claim 1, further including performing each one of:

collecting from the computing device hardware configuration data that are pertinent to power consumption, matching the collected hardware configuration data against the plurality of power estimation models that estimate power consumption for a given hardware configuration and a given set of metric data, selecting one of the plurality of power estimation models that most closely matches the collected hardware configuration data, collecting periodically from the computing device a set of metrics that are required by the selected one of the plurality of power estimation models, and periodically applying the selected one of the plurality of power estimation models to the collected set of metrics to produce an estimate of the power consumption of the computing device.

9. The method of claim 1, further including performing each one of:

connecting to one of a plurality of hardware components, determining one of a plurality of characteristics of the one of the plurality of hardware components, obtaining hardware information of the one of the plurality of hardware components, checking the one of the plurality of characteristics of the one of the plurality of hardware components against one of the plurality of power estimation models, selecting the one of the plurality of power estimation models that is most similar to the one of the plurality of characteristics of the one of the plurality of hardware components, collecting information technology (IT) performance metrics from the one of the plurality of hardware components, inputting the collected IT performance metrics into the selected one of the plurality of power estimation models for estimating power usage, wherein estimated power calculations are performed, storing results of the estimated power calculations, and retrieving the estimated power calculations that are stored.

10. The method of claim 1, further including performing each one of:

representing a plurality of characteristics of one of a plurality of hardware components as a vector of attribute-value pairs, including a set of a plurality of power estimation models in a device power model library of the one of the plurality of hardware components and associating each of the plurality of power estimation models with the vector describing the one of the plurality of hardware components to which one of the plurality of power estimation models applies, mapping a set of inputs consisting of one of a set of dynamic measurements and the plurality of characteristics of the one of the plurality of hardware components to a power estimate using each one of the plurality of power estimation models in the device power model library, and selecting a device power entry that most closely matches the plurality of characteristics of the one of the plurality of hardware components by computing a distance between the vector representing a detected one of the one of the plurality of hardware components and vectors in the device power model library and identifying one of the plurality of power estimation models having a shortest distance.

11. The method of claim 1, further including performing each one of:

defining distances between vectors of a plurality of characteristics of one of a plurality of hardware components, constructing a most similar matching one of the plurality of power estimation models by averaging over a plurality of K most similar matching plurality of power estimation models, where K is one of a chosen constant and a number of the vectors within a specified distance of a vector representing a detected one of the one of the plurality of hardware components, and selecting the most similar matching one of plurality of power estimation models.

* * * * *